United States Patent [19]

Nakamura

[11] Patent Number: 4,843,228

[45] Date of Patent: Jun. 27, 1989

[54] METHOD AND APPARATUS FOR NONCONTACT AUTOMATIC FOCUSING

[75] Inventor: Katushige Nakamura, Tokyo, Japan

[73] Assignee: Mitaka Kohki Company Ltd., Mitaka, Japan

[21] Appl. No.: 134,739

[22] Filed: Dec. 18, 1987

[30] Foreign Application Priority Data

Dec. 25, 1986 [JP] Japan ................................ 61-308029

[51] Int. Cl.⁴ ............................................. G01J 1/20
[52] U.S. Cl. .......................................... 250/201; 356/4
[58] Field of Search ...................... 250/201 AF, 204; 354/403; 356/1, 4

[56] References Cited

U.S. PATENT DOCUMENTS

| | | | |
|---|---|---|---|
| 4,276,471 | 6/1981 | Utagawa | 250/201 AF |
| 4,383,168 | 5/1983 | Luck, Jr. | 250/201 AF |
| 4,595,271 | 6/1986 | Suda et al. | 354/403 |
| 4,623,253 | 11/1986 | Okutani et al. | 356/375 |

Primary Examiner—David C. Nelms
Attorney, Agent, or Firm—Schwartz & Weinrieb

[57] ABSTRACT

Method and apparatus, employing a polarized He-Ne laser beam as a measuring beam, for changing the angle of incidence of the measuring beam upon an object in connection with a system capable of performing precision automatic focusing of the measuring beam upon the object in a noncontacting manner whether upon the surface of a transparent body or upon the surface of an opaque substance.

20 Claims, 9 Drawing Sheets

METHOD AND APPARATUS FOR NONCONTACT AUTOMATIC FOCUSING

FIELD OF THE INVENTION

The present invention relates to a method and apparatus for noncontact automatic focusing of a polarized He-Ne laser beam utilized as the measuring beam.

BACKGROUND OF THE INVENTION

It is a technically difficult problem to achieve optical focusing in a noncontacting manner upon objects varying in size, shape, and physical properties. However, because of the fact that there are a great many uses of the noncontact focusing technique, it is a subject of study by many researchers today.

As a focusing technique generally practiced heretofore, there is an image processing technique making use of a computer. Such an image processing technique, however, has difficulties in that it requires a large-scale apparatus and is slow in performing focusing operations because of the image scanning to be executed therein. Therefore, such a technique is not considered to be practical.

The present inventor, as a result of a long period of time of earnest study in order to provide an apparatus which can overcome the aforementioned difficulties, previously proposed a noncontact automatic focusing apparatus (Japanese Patent Application No. 60-214773).

With recent progress in technology, however, there have come into existence various objects which are to be focused, such as, for example, one including a transparent substance which is difficult to optically detect, one comprising such a transparent substance and having an opaque substance or portion disposed in within its vicinity or interiorly thereof, and one which is very small in size and shape.

OBJECT OF THE INVENTION

Accordingly, a primary object of the present invention is the provision of a method and apparatus for noncontact automatic focusing that are improved over those previously proposed and which are capable of being used in connection with such various objects as has been aforementioned both an accurate and effective manner.

BRIEF DESCRIPTION OF THE DRAWINGS

Various other features and advantages of the present invention will become apparent from the following detailed description taken in conjunction with the accompanying drawings wherein.

DESCRIPTION OF THE PREFERRED EMBODIMENTS

Preferred embodiments of the present invention will now be described below with reference to the accompanying drawings.

Figure 1:
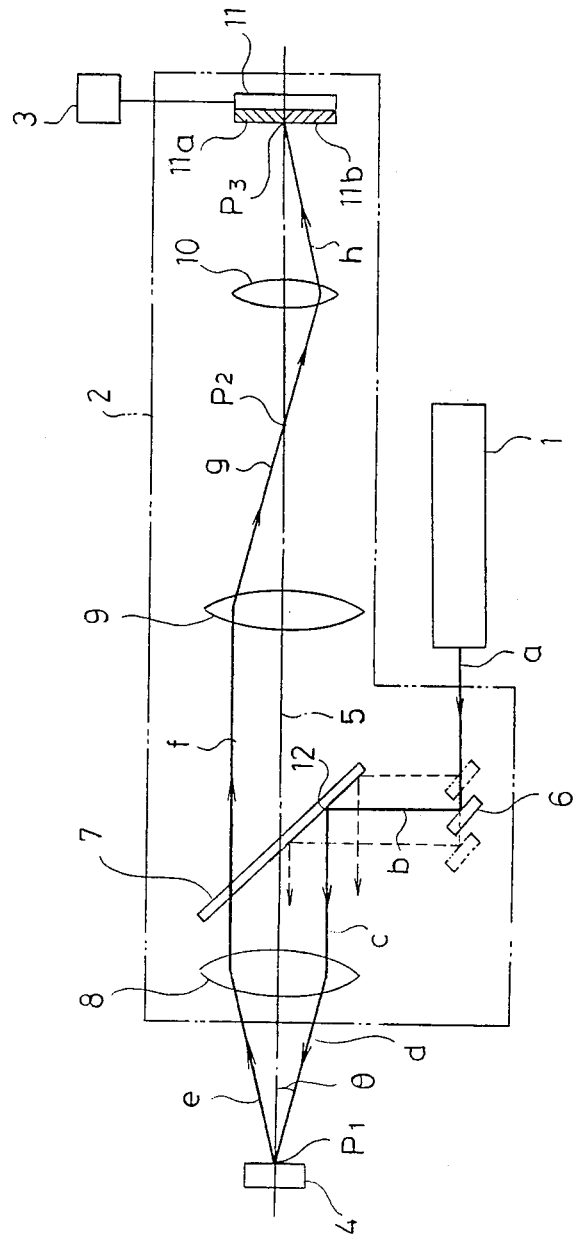
FIG. 1 is a schematic explanatory diagram showing the basic arrangement of the optical system according to a first embodiment of the present invention.
Figure 2:
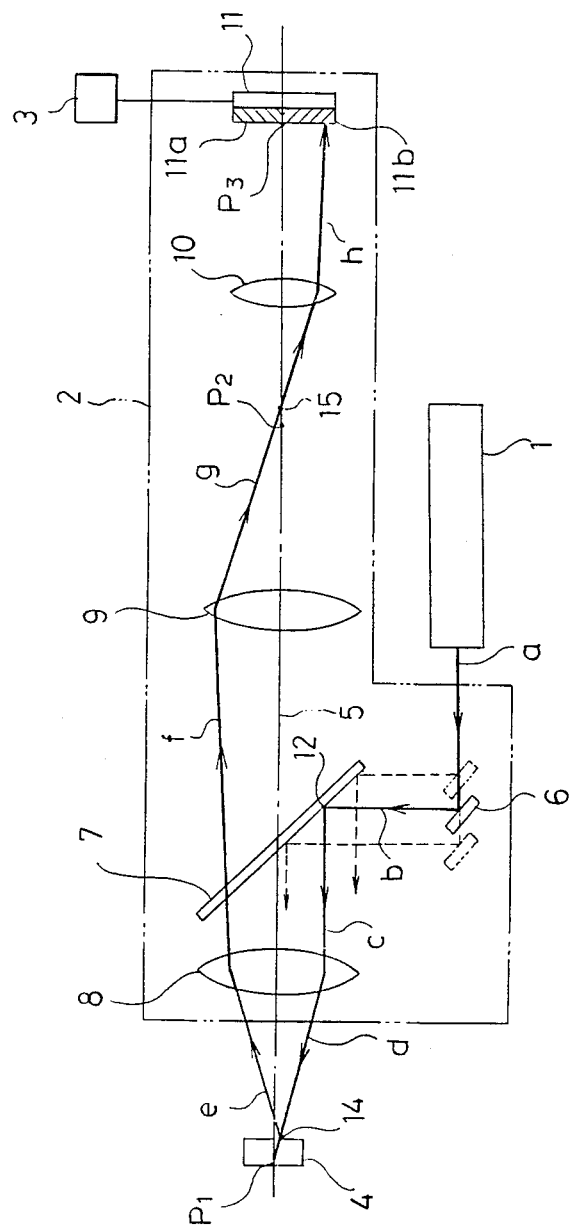
FIG. 2 is a schematic explanatory diagram of the arrangement corresponding to that in FIG. 1 showing the state of the object shifted toward the optical mechanism.
Figure 3:
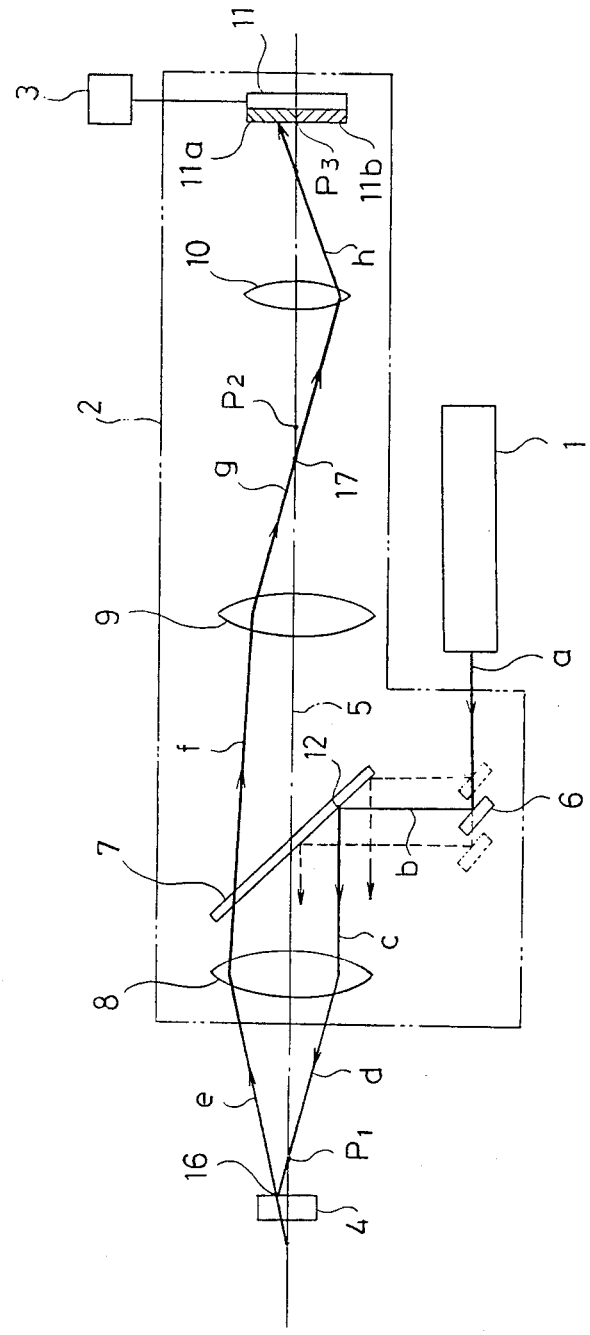
FIG. 3 is a schematic explanatory diagram of the arrangement corresponding to that in FIG. 1 showing the state of the object shifted away from the optical mechanism.

First Embodiment:

The basic arrangement of the noncontact automatic focusing apparatus according to the present invention will first be described based upon a first embodiment as shown in FIGS. 1 to 3. Referring to the drawings, reference numeral 1 denotes a laser mechanism, 2 (the portion enclosed by means of a two-dot chain line in the drawings) denotes an optical mechanism, 3 denotes a focusing mechanism, and 4 denotes an object to be illuminated and focused.

The laser mechanism 1 emits a polarized He-Ne laser beam as a measuring beam which is disposed in parallel with the optical axis 5 of the optical mechanism 2 to be described later.

The optical mechanism 2 includes a movable mirror 6, fixed mirror 7, objective lens 8, focusing lens 9, magnifying lens 10, and a light position detector 11. The movable mirror 6 is adapted to move in a direction which is parallel with the optical axis 5 so as to cause the measuring beam a emitted from the laser mechanism 1 to be reflected in a direction which is perpendicular to the original emission direction of the beam a. Accordingly, the movable mirror 6 is disposed at an angle of 45° with respect to the original emission direction of the beam a or with respect to the optical axis 5. The fixed mirror 7 is formed as a half mirror and is adapted to cause the measuring beam b reflected by means of the movable mirror 6 to be reflected again in a direction which is perpendicular to the light path b, so that it may be converted into the measuring beam c advancing parallel to the optical axis 5. Accordingly, fixed mirror 7 is also dispoded at an angle of 45° with respect to optical axis 5 so as to also be disposed parallel to movable mirror 6. The point of reflection 12 upon the fixed mirror 7 is changeable according to the position of the movable mirror 6 which is shifted or moved in the direction parallel to optical axis 5 and the measuring beam c is accordingly movable toward or away from the optical axis 5 as a result of the change in the location of the point of reflection 12 upon the fixed mirror 7.

The measuring beam c reflected from the fixed mirror 7 is then converted into the measuring beam d which is refracted by means of the objective lens 8 so as to impinge upon the object 4 where the focusing point $P_1$ $P_1$ coincides with the front surface 4a of the object 4. The angle of incidence $\theta$ of the measuring beam d upon the object 4 is determined to be dependent upon the distance between the measuring beam c and the optical axis 5. That is, when the measuring beam c reflected by means of the fixed mirror 7 is far away from the optical axis 5, the measuring beam c is refracted at a portion of lens 8 which is closer to the periphery of the objective lens 8 and therefore it is caused to impinge upon the object 4 at a larger angle of incidence $\theta$. Conversely, when the measuring beam c is located closer to the optical axis 5, the measuring beam c is refracted at a portion of lens which is located closer to the center of the objective lens 8 and therefore it is caused to impinge upon the object 4 at a smaller angle of incidence $\theta$.

The measuring beam e reflected from the front surface 4a of the object 4 at the angle of reflection of the same magnitude as the angle of incidence $\theta$ is again refracted by means of the objective lens 8 and turned into the measuring beam f which is disposed parallel to the optical axis 5. The measuring beam f is further refracted by means of the focusing lens 9 so as to be converted into the measuring beam g which is led through a refocusing point $P_2$ upon the optical axis 5 to the magnifying lens 10. The measuring beam g is refracted means of by the magnifying lens 10 and is converted into the measuring beam h to be received by means of the two photosensors 11a, 11b of the light position detector 11.

The light position detector 11 comprises a semiconductor position-sensitive detector (PSD). The semiconductor position-sensitive detector (PSD) provides a position signal containing positional information of an incident beam without the need for any scanning to be performed upon an image and has a higher resolution and a higher sampling grade than such solid state imaging elements as CCD and MOS. The light position detector 11 is electrically connected with the focusing mechanism 3, whereby the system is adapted such that a position signal indicating which one of the photosensors 11a, 11b of the light position detector 11 has received the measuring beam h is delivered to the focusing mechanism 3. In particular, the photosensor 11a transmits a signal to the focusing mechanism 3 so as to shorten the distance between the object 4 and the objective lens 8, while the photosensor 11b transmits a position signal to the focusing mechanism 3 so as to lengthen the distance defined between the object 4 and the objective lens 8.

The focusing mechanism 3 comprises a "servo mechanism" having a very high operating speed for driving a motor by means of a servo circuit. The focusing mechanism 3 is of course coupled with the object 4, such that the distance between the object 4 and the objective lens 8 is adjusted according to the position signal received from the light position detector 11 whereby the focusing point $P_1$ of the measuring beam d coincides with the front surface 4a of the object 4. Incidentally, in connection with the focusing mechanism 3, it is also possible to arrange the system such that the objective lens 8 (or the optical mechanism 2 as a whole) is moved or both the object 4 and the objective lens 8 (or the optical mechanism 2 as a whole) are moved.

State: In Focus (Refer to FIG. 1)

The state of in-focus is that in which the focusing point $P_1$ of the measuring beam d is coincident with the front surface 4a of the object 4. In this state, the measuring beam h reflected from the object 4 is received at the neutral position $P_3$ between the photosensors 11a, 11b, that is, at the balanced position, so that the focusing mechanism 3 is rendered inactive.

State: Object Located Closer to Optical Mechanism (Refer to FIG. 2)

In the case where the object 4 is shifted toward the optical mechanism 2 and therefore is out of focus, the measuring beam d refracted by means of the objective lens 8 is reflected at the point of reflection 14 on upon the front surface 4a of the object 4 at a position below the optical axis 5. The beam as it then passes through the objective lens 8 and the focusing lens 9, past the refocusing point 15 which is located at a position forward of the aforenoted refocusing position $P_2$, and through the magnifying lens 10 at a peripheral portion thereof, is received by means of the lower photosensor 11b. Thereupon, the pertinent position signal is delivered to the focusing mechanism 3 so as to cause the object 4 to move away from the optical mechanism 2, whereby the operation of the focusing mechanism 3 is stopped when the measuring beam h impinges upon the neutral position $P_3$ between the photosensors 11a, 11b. Thus, the focusing point $P_1$ of the measuring beam d now coincides with the front surface 4a of the object 4 as in FIG. 1.

State: Object Located farther away from Optical Mechanism (Refer to FIG. 3)

Conversely, in the case where the object 4 is shifted away from the optical mechanism 2 whereby the front surface 4a is located beyond the focusing point $P_1$, the measuring beam d refracted by means of the objective lens 8 is reflected at the point of reflection 16 upon the front surface 4a of the object 4 at a position above the optical axis 5. The beam then goes through the objective lens 8 and the focusing lens 9, past the refocusing point 17 which is located rearwardly of the refocusing position $P_2$, and through the magnifying lens 10 so as to be received by means of the upper photosensor 11a. Thereupon, the pertinent position signal is delivered to the focusing mechanism 3, so that the focusing mechanism 3 causes the object 4 to move closer to the optical mechanism 2 such that focusing of the measuring beam d as shown in FIG. 1 is thereby achieved.

In the described manner, even if the object 4 is located out of focus with respect to the focal point $P_1$ of the objective lens 8, the out-of-focus condition is automatically corrected so that complete coincidence between the focusing point $P_1$ of the measuring beam d and the front surface 4a of the object 4 is achieved. Futhermore, even if the object 4 is in a slanted or inclined attitude with reapect to the optical axis 5, such a condition does not present any problem because the light position detector 11 and the focusing mechanism 3 can be operated in accordance with rays of light reflected irregularly from the front surface 4a of the object 4. Although a half mirror is employed for the fixed mirror 7 in the above described basic arrangement, a dichroic mirror, laser mirror, or other mirror may be used instead. In addition, although a semiconductor position-sensitive detector (PSD) is employed for the light position detector 11, another type of light position detector such as, for example, a photodiode (PD) may be used so as to obtain effects similar to those noted. Furthermore, although a servo mechanism is employed in connection with the focusing mechanism 3, similar effects can be obtained from other mechanisms if they have an operating speed of the same degree as that of the servo mechanism. Still further, it is possible to dispose a polarization filter at a position just before the light position detector 11 so as to thereby shield the incident rays of light having wavelengths in the vicinity of the wavelength (6328 Å) of the polarized He-Ne laser beam so as to thereby enhance the antinoise properties thereof.

By utilization of the above described basic arrangement and its functioning operations, the following effective benefits, through already mentioned in the previous proposal (Japanese Patent Application No. 60-214773), can be obtained:

1. Because of the capability of positioning (distance setting) an object 4 the, positioning and setting of various components (objects) at a specific location can be performed correctly and quickly.

2. By executing such positioning (distance setting) as has been noted above for a plurality of points located upon one component (object) at the same time, the inclination (perpendicularity) of the component can be accurately set.

3. By arranging the system such that focusing is performed by moving the optical mechanism 2 by means of the focusing mechanism 3 and wherein the objective lens 8 may serve as the objective lens of an optical mechanism such as, for example a microscope or telescope, automatic focusing for such optical mechanisms can be achieved.

4. By arranging the system such that focusing is performed by moving the objective lens 8 and by numerically coding the amount of movement of the objective lens 8 by means of an encoder or the like, it becomes possible to measure the distance between the object 4 and the objective lens 8 (optical mechanism 2) from the derived numerical value in a noncontacting manner. Such an arrangement can also be applied to noncontact sensors in a three-dimensional measuring instrument or the automatic measurement of a liquid surface level.

5. When a transparent substance is interposed between a reflective object and the objective lens 8, the thickness of the transparent substance can be measured in a noncontacting manner in accordance with the amount of movement of the objective lens 8 and the index of refraction of the transparent substance.

The present noncontact automatic focusing apparatus is characterized in that it performs the noncontacting automatic positioning as described above through means of the suitably adjusted and selected angle of incidence $\theta$ developed as a result of the parallel movement of the movable mirror with respect to the optical axis 5, and as result of such operations, the following excellent functional effects can be obtained in addition to the above mentioned basic functional effects. A description of such excellent functional effects will be given in connection with the following.

Figure 4:
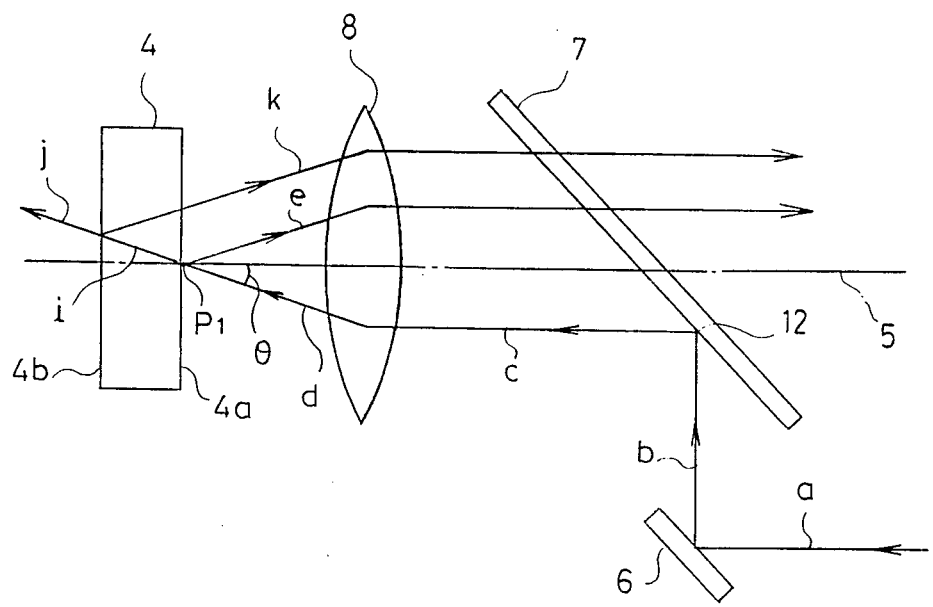
FIGS. 4 and 5 are enlarged explanatory views showing a second embodiment of the present invention.
Figure 5:
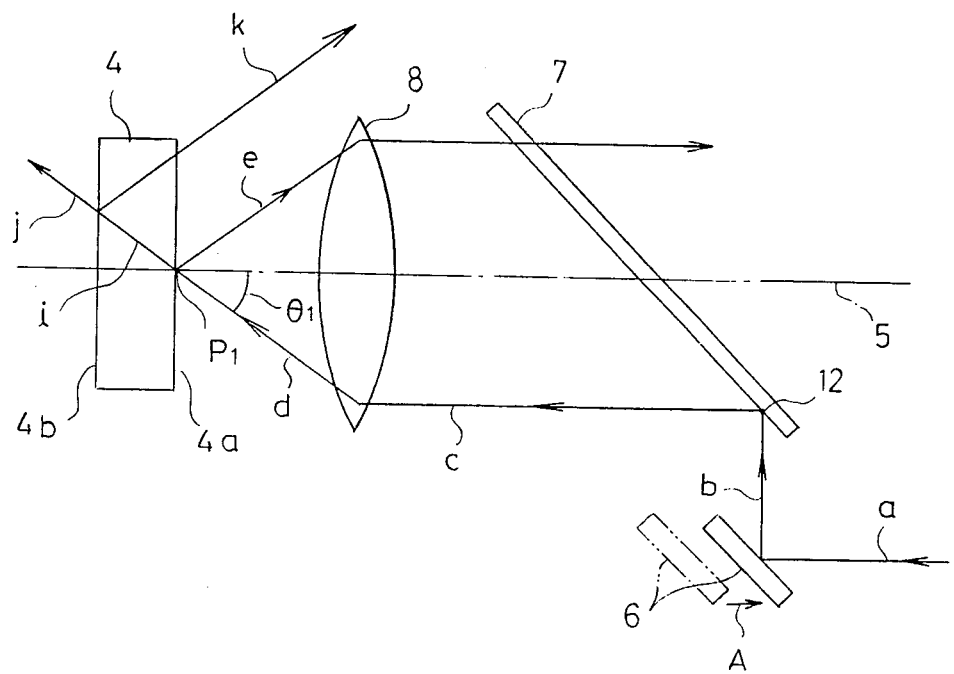

Second Embodiment:

FIGS. 4 and 5 are drawings showing a second emboidment of the present invention. Parts corresponding to those of the preceding embodiment are denoted by like reference numerals, and furthermore, the portion within the vicinity of the objective lens 8 of the optical mechanism 2 and the object 4 is illustrated while illustration of the other portions of the system has been omitted.

The present invention noncontact automatic focusing apparatus is characterized by the fact that the variable setting of the angle of incidence $\theta$ of the light upon the object 4 can be achieved in connection with the positioning (focusing) of a transparent body with respect to which optical sensing has been relatively difficult to achieve. A transparent body serving as the object 4 causes reflection from both its front surface 4a and its back surface 4b. That is, the measuring beam d limpinging upon the object at an angle of incidence $\theta$ is split into two portions, that is, one measuring beam i refracted and transmitted into the object 4 and the other measuring beam e reflected from the front surface 4a. The measuring beam i transmitted into the object 4 is further split into two portions, that is, one measuring beam j penetrating the back surface 4b of the body 4 to the outside thereof, and the other measuring beam k reflected by means of the back surface 4b. Accordingly, both the measuring beam e reflected from the front surface 4a and the measuring beam k reflected from the back surface 4b are again refracted by means of the objective lens 8 and are detected by means of the light position detector 11 (refer to FIG. 4). When the measuring beam e from the front surface 4a is more intense than the measuring beam, then focusing is achieved upon the front surface 4a, but if the measuring beam k reflected from the back surface 4b is more intense, due, for example, to the surface, condition of the back surface 4b, there is the risk that focusing achieved will be up on the back surface 4b because the light position detector 11 and the focusing mechanism 3 are then dominate by means of the measuring beam k which is reflected from the back surface 4b of the object 4.

In such a case, an improved result is obtained by imparting a parallel movement to the movable mirror 6 in the direction A away from the object, as seen in FIG. 5, so that the measuring beam c reflected by means of the fixed mirror 7 may be refracted by means of the objective lens 8 at a portion closer to the periphery thereof, whereby the measuring beam d is conducted onto the object 4 at a larger angle of incidence $\theta 1$. By so doing, the angles of reflection of both the measuring beams e, k at the front surface 4a and the back surface 4b, respectively, become larger, and thereby, the measuring beam k which is reflected from the back surface 4b is directed backwardly in a direction where the beam is unable to enter the objective lens 8. Therefore, only the measuring beam e which is reflected from the front surface 4a is refracted by means of the objective lens 8, and thus, it becomes possible to cause the focusing mechanism 3 to operate only in accordance with the measuring beam e. Although the measuring beam e which is reflected from the front surface 4a has only a small light quantity energy, or intensity because it is a reflected from the front surface 4a of the object 4 of comprising a transparent substance, there arises no problem when it is electrically amplified by means of the light position detector 11.

The present embodiment, in summary, is adapted to be able to adjust the angle of incidence $\theta$ of the measuring beam so that the measuring beam k which is reflected from a surface other than the front surface 4a of the object (transparent body) 4, from which focusing of the measuring beam is desired, may be reflected in a direction whereby the measuring beam k cannot enter the objective lens 8, and this embodiment is equally applicable to an object (transparent body) 4 which is provided with an opaque substance or the like which may be disposed upon the side of its back surface 4b joined thereto, or separated therefrom.

Figure 6:
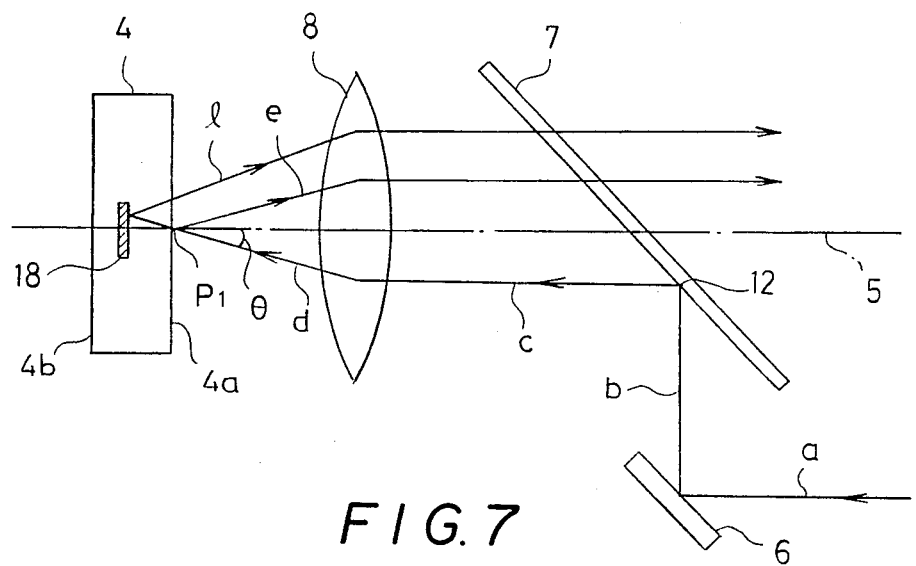
FIGS. 6 and 7 are enlarged explanatory views showing a third embodiment of the present invention.
Figure 7:
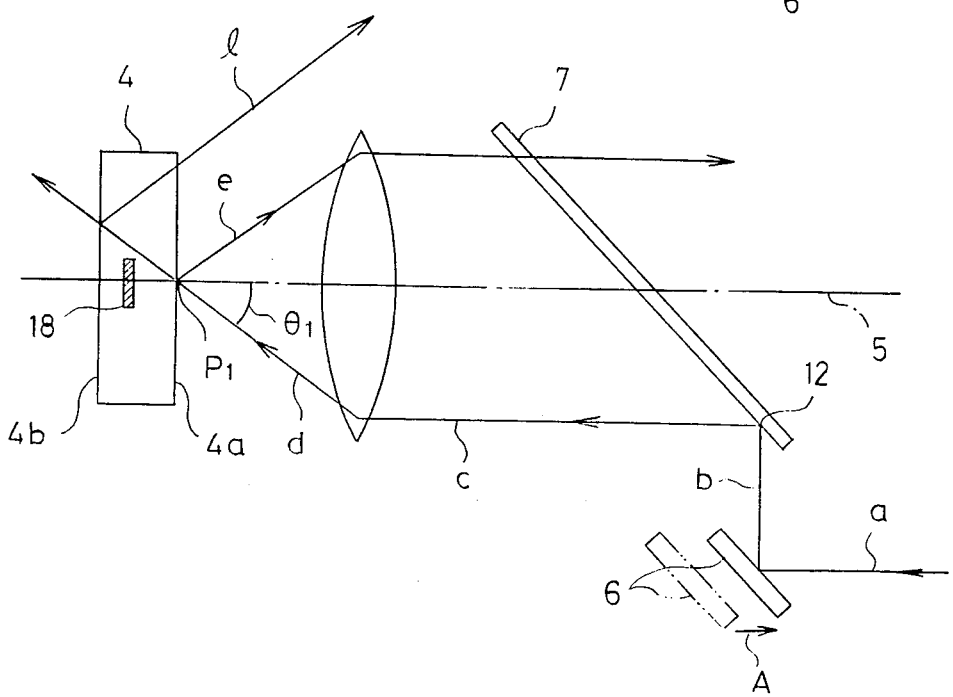
Figure 8:
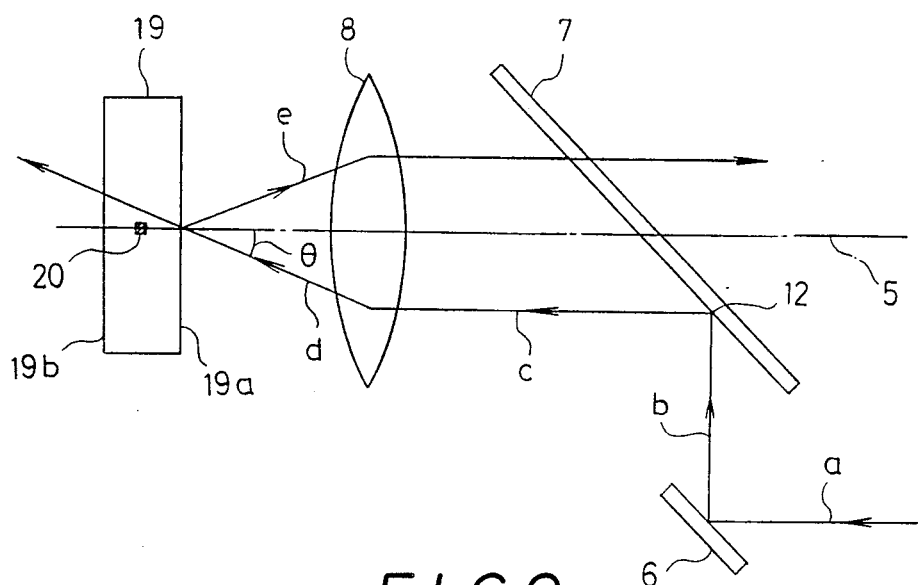
FIGS. 8 and 9 are enlarged explanatory views showing a fourth embodiment of the present invention.
Figure 9:
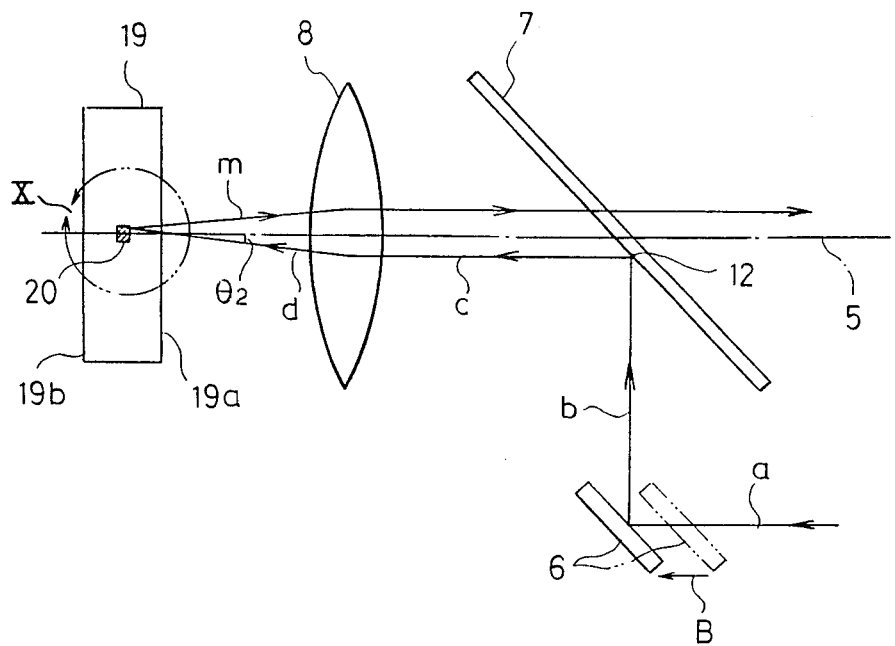
Figure 10:
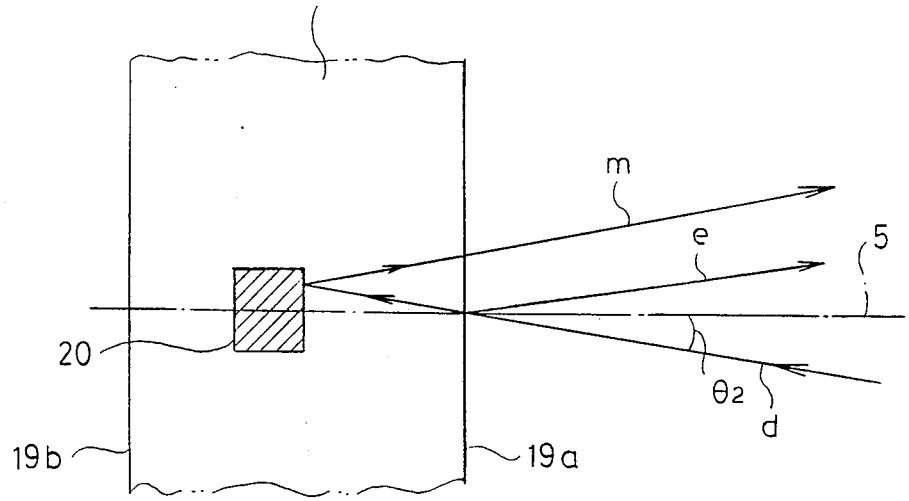
FIG. 10 is an enlarged view showing the portion indicated by the arrow X in FIG. 9.
Figure 11:
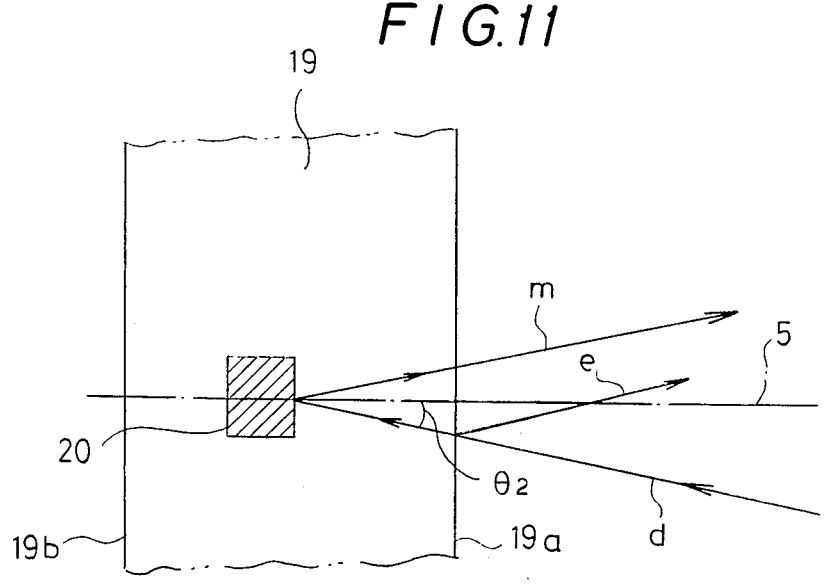
FIG. 11 is an enlarged view corresponding to FIG. 10 showing an opaque substance disposed in an in-focus state.

Third Embodiment:

FIGS. 6 and 7 are drawings showing a third embodiment of the present invention. In the present embodiment, a case wherein the transparent body (object) 4 includes therein an opaque substance 18 will be described. In the present case, the measuring beam 1 which is reflected from the opaque substance 18 is more intense than the measuring beam e which is reflected from the front surface 4a, and so, the light position detector 11 and the focusing mechanism 3 necessarily perform their focusing operation with respect to the surface of the opaque substance 18 (refer to FIG. 6). Consequently, the front surface 4a of the transparent body 4, focusing of which is desired, is out of focus. Even in such a case, the reflection of the measuring beam d from the opaque substance 18 can be avoided by imparting to the movable mirror 6 a parallel movement in the direction A away from the object, as seen in FIG. 7, so that the angle of incidence $\theta_1$ of the measuring beam d may become larger (refer to FIG. 7). Consequently, it becomes possible to cause the focusing mechanism 3 to operate only in accordance with the measuring beam e which is reflected from the front surface 4a of the transparent body 4 and to achieve focusing upon the front surface 4a of the transparent body 4. As the most suitable case to which the present embodiment is applicable, there is the case wherein an electronic circuit (semiconductor or the like) is enclosed within a transparent substrate. In addition, it is to be noted that the present invention is applicable not only in the case where an opaque substance 18 is located within a transparent body 4, but also in the case where, as described above, an opaque substance 18 or the like is disposed upon the side of the back surface 4b of the transparent body 4, joined thereto, or separated therefrom, wherein focusing salely upon the front surface 4a of the transparent body 4 can nevertheless be achieved in a manner similar to that previously described in connection with the present embodiment, if interference between the opaque substance 18 and the measuring beam d (irradiation thereof) is prevented.

Fourth Embodiment:

FIGS. 8 to 11 are drawings showing a fourth embodiment of the present invention. The present embodiment is concerned with the case wherein a small-sized opaque substance 20 is located within a transparent body 19 and focusing upon the surface of the small-sized opaque substance 20 is desired. Since the opaque substance 20 is small in size, the measuring beam d transmitted by means of the objective lens 8 does not impinge upon the same when the angle of incidence $\theta$ is large, that is, the light position detector 11 and the focusing mechanism 3 will be operated in accordance with the measuring beam e which is reflected from the front surface 19a of the transparent body 19 and whereby focusing is made upon the front surface 19a of the transparent body 19, so that the desired focusing upon the opaque substance 20 cannot be achieved (refer to FIG. 8).

In such a case, by imparting a parallel movement to the movable mirror 6 in the direction. B toward the object, the measuring beam d is caused to move closer to the optical axis 5 and irradiate the object at a small angle of incidence $\theta_2$ (refer to FIG. 9). Consequently, since the object is irradiated by means of the measuring beam d which has been brought closer to the optical axis 5, the measuring beam d is able to impinge upon the opaque substance 20 unless the same is extremely small. Once the measuring beam d impinges upon. the opaque substance 20, since the measuring beam m which is reflected from the opaque substance 20 is more intense than the measuring beam e which is reflected from the front surface 19a of the transparent body 19 (refer to FIG. 10), the light position detector 11 and the focusing mechanism 3 are caused to operate in accordance with the measuring beam m which is reflected from the opaque substance 20 and thereby focusing upon the surface of the opaque substance 20 is achieved (refer to FIG. 11). Even if the transparent body 19 is thick, the focusing is smoothly achieved. Therefore, the present embodiment is applicable for use in such cases wherein, as aforementioned, an electronic circuit (semiconductor or the like) is enclosed within a transparent substrate and it is desired to attain focusing upon the electronic circuit, or wherein the present noncontact automatic focusing apparatus is incorporated within a microscope and it is desired to attain focusing upon a specimen as the object which is sandwiched between a slide glass and a cover glass. Furthermore, it is possible to effect focusing not only upon an opaque substance 20 disposed within a transparent body 19, but also upon an opaque substance 20 or the like disposed, as mentioned in the foregoing, on the side of the back surface 19b of the transparent body 19 when joined thereto or separated therefrom.

Figure 12:
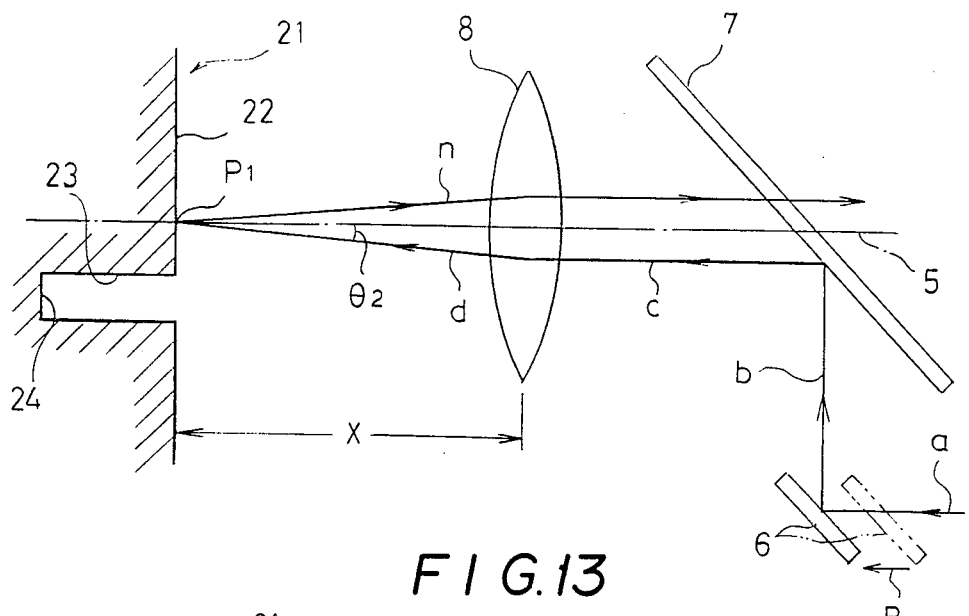
FIGS. 12, 13 and 14 are enlarged explanatory views showing a fifth embodiment of the present invention.
Figure 13:
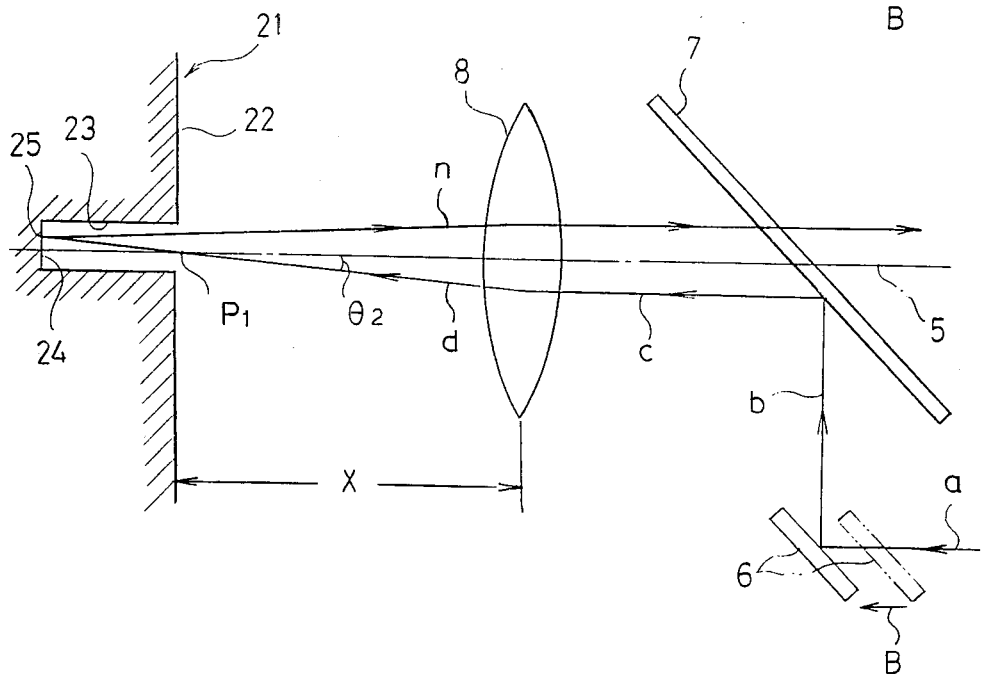
Figure 14:
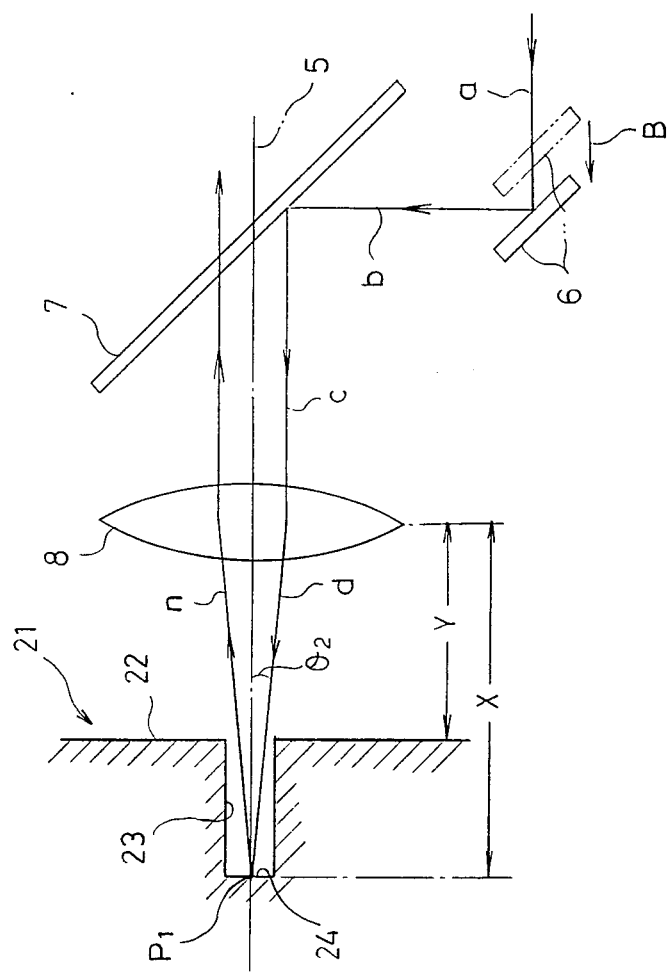

Fifth Embodiment:

FIGS. 12 to 14 are drawings showing a fifth embodiment of the present invention. The present embodiment comprises noncontact automatic focusing apparatus which is utilized for the measurement of a distance in a noncontacting manner. Within the surface 22 of the object 21 there is defined a deep hole 23 having a very small diameter. Since this hole 23 is very small in diameter and large in depth, it is difficult to measure its depth with an ordinary measuring instrument. But the measurement becomes possible by utilizing the noncontact automatic focusing apparatus according to the present invention.

As the first step, by moving the movable mirror 6 in the direction B toward the object, the measuring beam d is caused to move closer to the optical axis 5 and irradiate the surface 22 at a small angle of incidence $\theta_2$ so as to thereby have the focal point $P_1$ disposed thereon. The distance between the surface 22 and the objective lens 8 (optical mechanism 2) at this time will be represented by X (refer to FIG. 12). As the second step, the optical mechanism 2 as a whole undergoes a parallel movement with respect to optical axis 5 so that the focal point $P_1$ of the measuring beam d is brought to the center of the hole 23. Then, the measuring beam d impinges upon the bottom 24 of the hole 23 and is reflected therefrom to the objective lens 8 as the measuring beam n (refer to FIG. 13). Since the angle of incidence $\theta_2$ of the measuring beam d is small at this time, the inner walls or other portions of the hole 23 do not interfere with it, and thus the beam is properly reflected. Because the point of reflection 25 at the bottom 24 of the hole 23 is not coaxial with the optical axis 5, the optical mechanism 2 as a whole is moved toward the object 21 by means of the operation of the focusing mechanism 3 so that the focal point p1 $P_1$ coincides with the optical axis 5 at the bottom 24 of the hole (refer to FIG. 14). If the distance between the surface 22 and the objective lens 8 (optical mechanism 2) at this time is represented by Y, the depth of the hole 23 is obtained from X - Y. Alternatively, since the amount of movement of the objective lens 8 (optical mechanism 2) corresponds to the depth of the hole 23, the depth of the hole 23 may also be obtained directly from the amount of the movement of the lens 8 to be measured by means of an encoder or the like.

Since the measuring beam a, . . . is a polarized He-Ne laser beam and the angle of incidence $\theta$ of the measuring beam d can be adjusted to a very small magnitude by imparting a movement to the movable mirror 6 which is parallel to the optical axis 5, as has been noted hereinabove it is possible to carry out the measurement of the depth of a hole 23 having a very small diameter, which has so far been relatively difficult to achieve, automatically and in a noncontacting manner. In addition, even if a transparent substance is interposed between the hole 23 as the object of measurement and the objective lens 8, the measurement can nevertheless be smoothly carried out as has been noted hereinabove.

Since the present invention is of the character as described so far, various effects can be achieved thereby as follows:

(a) Even in the case of an object which comprises a transparent body which is difficult to optically detect, or in the case of such a body combined with opaque substance which is joined thereto or separated therefrom, focusing can be smoothly achieved with a high degress of precision in a noncontacting matter either upon the front surface of the transparent body or upon the surface of the opaque substance by adjusting the angle of incidence of the measuring beam.

(b) Since the angle of incidence can be made small, focusing operations can be performed in connection with an object of minute size.

(c) Since a polarized He-Ne laser beam is employed as the measuring beam, the beam is thinner than any other laser beam, and in addition thereto, its convergent spot is very small in size and not diverging. Accordingly, the position detected by means of the light position detector can be carried out with a high degree of accuracy (high resolution). The diameter of the convergent spot of the polarized He-Ne laser beam is as small as approximately $1\mu$–$100\mu$although it depends upon the power of the objective lens, whereby focusing is achieved with a high degree of accuracy.

Furthermore, according to the embodiments of the present invention:

(d) Since the shifted movement of the measuring beam is magnified by means of a magnifying lens, even a small shifted movement shift can be accurately enlarged, and since the position is then detected by means of the light position detector, highly accurate position detection can be achieved. Thus, even under the condition wherein a large distance is defined between the objective lens and the object whereby the accuracy in the focus detection is liable to decreased, highly accurate focusing can be achieved, that is, focusing is achieved with a high degree of accuracy.

(e) Since the semiconductor position-sensitive detector (PSD) which serves as the light position detector is such that it only outputs the axial position of the detected spot of the measuring beam, the performance is not affected by any change in the luminance distribution, or more particularly, the accuracy of the focusing is not affected by the luminance distribution (contrast) upon the surface of the subject, that is, high antinoise properties and high reliability in the measurement are provided.

(f) Since a semiconductor position-sensitive detector (PSD) is employed as the light position detector, and a servo mechanism is employed as the focusing mechanism, adjustment of the distance between the optical mechanism and the object can be achieved in a short period of time, such as, for example, 10 mm sec, whereby focusing is achieved at a high rate of speed.

Obviously, many modifications and variations of the present invention are possible in light of the above teachings. It is therefore to be understood that within the scope of the appended claims, the present invention may be practiced otherwise than as specifically described herein.

What is claimed is:

1. A method for non-contact automatic focusing of a light beam upon a transparent body, comprising the steps of:
   reflecting a laser beam as a measuring beam, which is emitted in parallel with an optical axis of an optical system, by means of a movable mirror which is movable in a direction which is parallel with said optical axis and which is disposed at an angle of inclination of 45 degrees with respect to said optical axis;
   reflecting said measuring beam, reflected from said movable mirror, by means of a fixed mirror which is disposed at an angle of inclination of 45 degrees with respect to said optical axis so as to also be disposed parallel to said movable mirror;
   conducting said measuring beam, reflected from said fixed mirror and then refracted by an objective lens, into a transparent body;
   receiving said measuring beam, reflected from the front surface of said transparent body and the refracted again by said objective lens, by means of a light position detector, said movable mirror being movable in said direction parallel to said optical axis such that when said movable mirror is progressively moved away from said transparent body said measuring beam is reflected from said fixed mirror and refracted by said objective lens at a location which is progressively further away from said optical axis whereby the angle of incidence and reflection of said measuring beam upon and from said transparent body is progressively greater, whereas when said movable mirror is progressively moved toward said transparent body said measuring beam is reflected from said fixed mirror and refracted by said objective lens at a location which is progressively closer to said optical axis whereby the angle of incidence and reflection of said measuring beam upon and from said transparent body is progressively smaller, as desired; and
   adjusting the distance between said transparent body and said objective lens by means of a focusing mechanism in response to a position signal output from said light position detector so as to thereby achieve automatic focusing of said measuring beam upon said front surface of said transparent body.

2. A method according to claim 1, wherein said transparent body includes an opaque substance therewithin, and wherein said measuring beam reflected from said transparent body includes a first measuring beam portion reflected from said front surface of said transparent body, and a second measuring beam portion reflected from a portion of said transparent body other than said front surface of said transparent body, said method further comprising the step of:
   moving said movable mirror in said direction parallel to said optical axis and away from said transparent body such that said measuring beam is conducted onto said transparent body with a large angle of incidence whereby said second measuring beam portion does not intercept said opaque substance disposed within said transparent body and does not enter said objective lens for transmission to said light position detector, while only said first measuring beam portion reflected from said front surface of said transparent body enters said objective lens for transmission to said light position detector.

3. A method according to claim 1, wherein said transparent body is provided with an opaque substance therewithin, and wherein said measuring beam reflected from said transparent body includes a first measuring beam portion reflected from said front surface of said transparent body, and a second measuring beam portion reflected from a portion of said transparent body other than said front surface of said transparent body, said method further comprising the step of:

moving said movable mirror in said direction parallel to said optical axis and toward said transparent body such that said measuring beam is conducted onto said transparent body with a small angle of incidence whereby said measuring beam intercepts said opaque substance such that both said first measuring beam portion reflected from said front surface of said transparent body and said second measuring beam portion reflected from said opaque substance disposed within said transparent body will enter said objective lens for transmission to said light position detector whereby focusing upon said opaque substance is achieved.

4. A method according to claim 2, wherein said transparent body includes therein an opaque substance having a surface size smaller than the surface size of said transparent body.

5. A method according to claim 3, wherein said transparent body is provided with an opaque substance having a surface size smaller than the surface size of said transparent body and is disposed on the back surface thereof.

6. The method as set forth in claim 1, wherein said method further comprises:
using a polarized He-Ne laser.

7. The method as set forth in claim 2, wherein said method further comprises:
using a polarized He-Ne laser.

8. The method as set forth in claim 3, wherein said method further comprises:
using a polarized He-Ne laser.

9. A method for non-contact automatic focusing of a light beam upon an object, comprising the steps of:

reflecting a laser beam as a measuring beam, which is emitted in parallel with an optical axis of an optical system, by means of a movable mirror which is movable in a direction which is parallel with said optical axis and which is disposed at an angle of inclination of 45 degrees with respect to said optical axis;

reflecting said measuring beam, reflected from said movable mirror, by means of a fixed mirror which is disposed at an angle of inclination of 45 degrees with respect to said optical axis so as to aslo be disposed parallel to said movable mirror;

conducting said measuring beam, reflected from said fixed mirror and then refracted by means of an objective lens, onto the bottom of a deep hole having a small diameter and defined within the surface of said object;

receiving said measuring beam, reflected from said bottom of said hole and then refracted again by means of said objective lens, by means of a light position detector, said movable mirror being movable in said direction parallel to said optical axis such that when said movable mirror is progressively moved away from said object with said hole said measuring beam is reflected from said fixed mirror and refracted by said objective lens at a location which is progressively further away from said optical axis whereby the angle of incidence and reflection of said measuring beam upon and from said object is progressively greater, whereas when said movable mirror is progressively moved toward said object said measuring beam is reflected from said fixed mirror and refracted by said objective lens at a location which is progressively closer to said optical axis whereby the angle of incidence and reflection of said measuring beam upon and from said object is progressively smaller, as desired; and adjusting the distance defined between said bottom of said hole and said objective lens by means of a focusing mechanism in response to a position signal output from said light position detector so as to thereby achieve automatic focusing of said measuring beam upon said bottom of said hole.

10. The method as set forth in claim 9, wherein said method further comprises:
using a polarized He-Ne laser.

11. Non-contact automatic focusing apparatus, comprising:

laser means for emitting a laser beam in a direction parallel to an optical axis upon which an object to be focused is disposed;

a first mirror, disposed at an angle of 45° with respect to said optical axis and movable in a reciprocating manner in a direction parallel to said optical axis, for reflecting said laser beam toward said optical axis;

a second mirror disposed at an angle of 45° with respect to said optical axis and disposed parallel to said movable mirror for reflecting said laser beam, received from said first movable mirror, toward said object-to-be-focused along a path disposed parallel to said optical axis and at a predetermined distance from said optical axis in accordance with a predetermined position of said movable mirror;

an objective lens for conducting said laser beam, transmitted from said second mirror, onto said object-to-be-focused with a predetermined angle of incidence dependent upon said distance of said light path said optical axis; and for conducting said laser beam, reflected from said object-to-be-focused at a predetermined angle of reflection, back toward said fixed mirror;

said first movable mirror being movable in said direction parallel to said optical axis such that when said movable mirror is moved progressively away from said object-to-be-focused, said laser beam will be reflected from said fixed mirror and refracted by said objective lens at a location which is progressively further away from said optical axis whereby the angle of incidence and reflection of said laser beam upon and from said object-to-be-focused is progressively greater; whereas when said movable mirror is moved progressively toward said object-to-be-focused said laser beam is reflected from said fixed mirror and refracted by said objective lens at a location which is progressively closed to said optical axis whereby the angle of incidence and reflection of said laser beam upon and from said object-to-be-focused is progressively smaller, as desired; a light position detector for receiving said laser beam from said objective lens as reflected from said object-to-be-focused and for emitting a position output signal indicative of the position of said laser beam, reflected from said object-to-be-focused and transmitted by said objective lens, relative to said optical axis; and focusing means for adjusting the distance defined between said object-to-be-focused and said objective lens in response to said position output signal of said light position detector so as to achieve automatic focusing of said laser beam upon said object-to-be-focused.

12. Apparatus as set forth in claim 11, wherein: said laser means is a polarized He-Ne laser.

13. Apparatus as set forth in claim 11, further comprising:
a focusing lens interposed between said objective lens and said light position detector for focusing said laser beam transmitted by said objective lens toward said optical axis.

14. Apparatus as set forth in claim 11, wherein: said light position detector comprises two co-planar photosensors disposed upon opposite sides of said optical axis.

15. An apparatus according to claim 11, wherein said fixed mirror is a half mirror.

16. An apparatus according to claim 11, wherein said light position detector is a semiconductor position-sensitive detector.

17. An apparatus according to any of claims 11, wherein said focusing mechanism includes a servo mechanism.

18. An Apparatus according to claim 15, wherein: said light position detector is a semiconductor position-sensitive detector.

19. Apparatus as set forth in claim 16, wherein: said focusing means includes a servo mechanism.

20. Apparatus as set forth in claim 13, wherein: said focusing means includes a servo mechanism.

* * * * *